(12) United States Patent
Kocherginsky et al.

(10) Patent No.: US 6,521,117 B2
(45) Date of Patent: Feb. 18, 2003

(54) METHOD FOR METAL RECOVERY FROM AQUEOUS SOLUTIONS

(75) Inventors: Nikolai Kocherginsky, Urbana, IL (US); Andrew Grishchenko, Riga (RU)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/862,724

(22) Filed: May 23, 2001

(65) Prior Publication Data

US 2002/0060162 A1 May 23, 2002

Related U.S. Application Data

(60) Provisional application No. 60/206,267, filed on May 23, 2000.

(51) Int. Cl.[7] .............................. C25C 1/00; C25C 1/12
(52) U.S. Cl. ...................... 205/574; 205/581; 205/772; 423/24
(58) Field of Search ................................ 205/574, 581, 205/772; 423/24

(56) References Cited

U.S. PATENT DOCUMENTS

| | | | | |
|---|---|---|---|---|
| 4,592,973 A | * | 6/1986 | Pemsler et al. | ............. 429/206 |
| 4,789,444 A | * | 12/1988 | Watanabe et al. | ........... 205/574 |
| 6,051,112 A | * | 4/2000 | Broan et al. | ................. 204/164 |

* cited by examiner

Primary Examiner—Arun S. Phasge
(74) Attorney, Agent, or Firm—Birch, Stewart, Kolasch & Birch, LLP (57) ABSTRACT

The present invention is directed to an improved process for the recovery of metal ions from metal-containing aqueous solutions using a supported liquid membrane (SLM) whereby the pH of the metal-containing solution is preferably adjusted to between 5.5 and 8 and ammonia or other weak base is present in the metal-containing solution in a concentration sufficient to form a complex between the weak base and metal ions present in the solution. The present invention permits enhanced recovery of metal in the solution without any need to adjust the pH of the solution during the SLM process.

29 Claims, 5 Drawing Sheets

METHOD FOR METAL RECOVERY FROM AQUEOUS SOLUTIONS

This application claims priority on provisional Application No. 60/206,267 filed on May 23, 2000, the entire contents of which are hereby incorporated by reference.

BACKGROUND OF THE PRESENT INVENTION

This invention describes an improved method for the efficient recovery of metal ions such as copper ions from aqueous solution by use of a supported liquid membrane.

Copper may be extracted from a variety of liquid compositions such as copper-containing waste solutions, spent cupric and alkaline streams resulting from copper etching, rinse water from copper electroplating processes, copper-containing solutions resulting from the precipitation of basic coppers salts, as well as production of a micronutrient supplement as described in U.S. Pat. No. 5,451,414.

The concentration of copper in such compositions generally ranges from about $5-50 \times 10^{-2}$ g/l, and more generally from about $1-2 \times 10^{-1}$ g/l. U.S. Pat. Nos. 3,927,169; 3,988,151; 4,083,758; 4,336,231; 5,670,035; and 5,895,633 disclose the recovery of copper from relatively concentrated solutions (>2 g/l Cu) by liquid/liquid extraction. However, the concentration of copper which is usually present in copper-containing waste solutions is too low for profitable application of liquid/liquid extraction and too high for application of ion exchange. Indeed, Tavlarides et al. in "Solvent Extraction, Membranes and Ion Exchange in Hydrometallurgical Dilute Metals Separation" state that solvent extraction is uneconomical in the handling of large volumes of solution containing low metal values.

Liquid membrane separation, which combines the steps of solvent extraction with membrane separation followed by stripping from the membrane in a single process, is generating special interest because of its potential for low cost and energy saving. One type of liquid membrane system is supported liquid membrane (SLM). SLM employs a solvent/carrier mixture contained within the pores of a polymeric membrane support. In an SLM process, a metal ion may be selectively removed from an aqueous metal ion-containing feed solution by reaction of the metal ion with the carrier to form a metal ion-containing complex in the membrane impregnated with the solvent/carrier mixture. The membrane is interposed between the metal ion-containing feed solution and an aqueous stripping solution. The metal ion-containing complex diffuses through the membrane and metal ions are then stripped from the complex at the other side of the membrane by contact with the stripping solution. Sulfuric acid is one example of a stripping solution that may be employed in an SLM process. The pH gradient between the feed and stripping solutions is the driving force for the SLM process.

The removal of metal ions by use of supported liquid membranes is described in U.S. Pat. Nos. 5,114,579, 4,661,257 and 4,617,125, each herein incorporated by reference.

More specifically, in a typical SLM process $Me^{n+}$ ions are transferred from the feed to the stripping solution and exchanged to $nH^+$ ions of the stripping solution whereby the pH of the solution decreases over time. As a result, the driving force of the process changes with time. The resulting decrease of pH of the feed solution reduces the effectiveness of the extraction of metal ions from the feed solution and reduces the rate of the SLM transfer. A typical SLM process needs "on line" pH adjustment in order to maintain the driving force of SLM process. From this point of view the SLM process is similar to liquid/liquid extraction. Garry Kordosky et al. "The Use of pH Control in Solvent Extraction Circuit", Henkel Corporation, 1979, describe the technique and advantages of pH controlled liquid/liquid extraction. Generally, laboratory experiments are conducted using a flat sheet membrane module and the cell can be equipped by simple pH-stat for control. It is much more difficult to achieve a pH controlled pilot scale SLM process.

Large-scale SLM processes are conducted in an apparatus having a high surface/volume ratio, for example, by use of hollow fiber modules. The pH of the feed solution flowing through the hollow fibers changes dramatically over time and it is not possible to adjust the composition of the feed solution during transport through the hollow fibers. The inability to maintain maximal driving force during the SLM process leads to a decrease of the removal rate and may lead to a result where it is not possible to achieve complete removal of targeted ions. A solution to such a problem is proposed in U.S. Pat. No. 5,868,935, where a decrease in pH associated with the extraction of a cation into a solvent with a carrier, having an exchangeable proton, is offset by simultaneous removal of $H^+$ ions together with a different ion, having an opposite charge, through another membrane into a different solution. Unfortunately, it is not common for a different suitable anion and cation species to be simultaneously present in metal-containing aqueous waste solutions. The process itself becomes more complicated because of the necessity of using two different membranes.

U.S. Pat. No. 5,188,703 discloses a method for the recovery of copper recovery from spent ammoniacal etchant. A complex salt of copper is precipitated by the addition of hydrochloric acid. However, around 1,000 ppm of copper together with a high concentration of $NH_3$ remains in solution.

A description of the simultaneous processing of a copper containing ammoniacal and acidic solution can be found in U.S. Pat. No. 5,451,414, which discloses a process of micronutrient supplement manufacturing by mixing spent ammoniacal and acidic etchants together with the precipitation of copper basic chloride, which is used as a micronutrient supplement. About 500 ppm (0.5g/l) copper accompanied by a high concentration of $NH_3$ remains in solution in this process.

OBJECTS AND SUMMARY OF THE PRESENT INVENTION

It is accordingly one object of the present invention to provide an improved process for the recovery of metal ions from an aqueous feed solution by use of a supported liquid membrane.

It is further an object of the present invention to provide a process for the removal of metal ions from an aqueous feed solution by use of a supported liquid membrane which allows effective removal of the metal ions without adjustment of the composition of the feed solution during removal of the metal ions.

It is another object of the present invention is provide an efficient process for the removal/recovery of metal ions from dilute aqueous solutions whereby the metal concentration is too low for solvent extraction and too high for ion exchange to be practical.

It is still yet another object of the present invention to provide an efficient and highly effective process for the removal of copper ions from aqueous feed solution by use of a supported liquid membrane.

In accordance with the present invention, there is thus provided an improved process for the recovery of metal ions from metal-containing aqueous solutions using a supported liquid membrane (SLM) whereby the pH of the metal-containing solution is adjusted to between 5.5 and 8 and ammonia or other weak base or salt thereof is present in the metal-containing solution, preferably in a concentration of from 0.5 to 8 M, whereby complexes are formed between the ammonia or other weak base or salt thereof and metal ions present in the solution. The present invention permits enhanced recovery of metal ions from solution without any need to adjust the pH of the solution during the SLM process.

DETAILED DESCRIPTION OF THE PRESENT INVENTION

The present invention is directed to the recovery of metals from metal-containing aqueous feed solutions by use of supported liquid membranes.

More particularly, the present invention is directed to an improved method for effectively and efficiently removing and/or recovering metal ions, especially copper ions, by use of a supported liquid membrane (SLM), preferably in association with recovery of the metal ions by metal salt crystallization or other conventional recovery methods (e.g., by use of a copper electrowinning process in relation to the recovery of copper). More particularly, the present invention is directed to a method for increasing the net metal ion transport during the SLM process resulting in more complete removal of the metal from the feed solution. The removal of a variety of metals, forming complexes with ammonia or other weak base or salt thereof, can be undertaken in accordance with the present invention with enhanced efficiency in comparison to prior art SLM processes.

It has been surprisingly and unexpectedly discovered that, if the composition of the metal-containing feed solution is adjusted such that the pH of the solution ranges from about 5.5 to about 8.0, and preferably from about 6 to about 7, and the concentration of the ammonia or other weak base or salt thereof in the feed solution preferably ranges from about 0.5 to about 8 M, and preferably at least 1M, the extraction of metal ions (e.g., copper ions) from the feed solution is not accompanied by a decrease of the pH of the feed solution upon removal of metal during the SLM process. The pH of the feed solution will be higher than the pH of the stripping solution to enhance the efficiency of the process. Further, the ammonia or other weak base or salt thereof shall be present in stoichiometric excess to that of the metal ion in the feed solution. It is desirable for the molar concentration of the ammonia or weak base or salt thereof to be at least 2–4 times greater than the molar concentration of the metal ions in solution.

While ammonia or a salt thereof is the preferred weak base for use in the present invention, other weak bases can be employed, such as but not being limited to hydrophilic organic amines such as methylamine, ethylamine and various aromatic amines. The selection of such weak bases is within the skill of the routineer in the art, with suitable weak bases being capable of forming a complex with the metal ions in the solution. The purpose of the present invention is to extract the metal ion from solution and transfer the metal ion through the membrane in exchange for two protons (in the case of copper ions) from the more acidic stripping solution. In a prior art context, the aqueous feed solution thus becomes more acidic and the process eventually ceases. However, if the metal ion is in a complex with a weak base, it dissociates upon removal of the metal from the aqueous solution and the metal ion is transferred to the liquid extractant. The base binds hydrogen ions in the water and prevents the aqueous feed solution from becoming more acidic.

In one embodiment of the present invention, the feed solution is passed through porous hollow fibers having pores impregnated with an organic solution, which includes an extractant chemical. The metal containing solution contacts one side of the porous hollow fibers, whereby a metal-extractant complex is selectively formed with the metal (e.g. copper) ions contained in the feed solution. After diffusion of this complex through the impregnated wall of the hollow fibers, the complex is destroyed upon contact with the stripping solution (e.g., 2M sulfuric acid or other strong acid with similar concentration), which is fed in the module adjacent the hollow fibers and contacts another side of the hollow fibers. Metal ions are released to diffuse into the acid and concentrated therein due to the pH difference maintained between the feed and stripping solutions.

At equilibrium the ratio of concentrations of the metal ions that are carried through the membrane is determined by the "Donnan equilibrium" conditions. In the case of $Cu^{2+}$ or other bivalent cations, the equilibrium of the system can be described by the following equation (1):

$$\frac{Cu^{2+}_{Feed}}{Cu^{2+}_{Strip}} = \frac{(H^+_{Feed})^2}{(H^+_{Strip})^2} \quad (1)$$

In accordance with the present invention, it is possible, for instance, to concentrate copper in the stripping solution with the copper concentration being up to 14 orders of magnitude higher than the copper concentration in the feed solution. The sole limiting factor for the increase of copper (II) concentration in the stripping solution is its solubility in the stripping solution. In the case of copper, one stripping solution that may be successfully employed is 2M sulfuric acid.

After the concentration of the metal in the stripping solution reaches a sufficiently high level, for example, 50g/l in the case of copper in a sulfuric acid stripping solution, the concentrated stripping solution can be replaced by fresh sulfuric acid or another copper solution in sulfuric acid having a lower copper concentration.

The metal in the stripping solution can be recovered by conventional means known to those of ordinary skill in the art. For instance, copper can be recovered from a concentrated copper solution in sulphuric acid by cooling the final stripping solution to an extent (e.g., down to 0° C.) such that copper crystallizes as copper sulphate pentahydrate. Crystallization can decrease the concentration of the copper in the stripping solution to approximately 20 g/l or so. The final stripping solution containing approximately 20 g/l copper can be reused as the stripping solution. Copper can also be recovered from the stripping solution by electrowinning of the copper from the solution.

By way of specifics, the SLM process of the present invention may be used to remove a variety of metal ions from a metal-containing feed solution. While the process of the present invention is particularly useful in the recovery of copper from a copper-containing feed solution, and the invention is described herein in relation to the recovery of copper, the SLM process of the present invention is useful in the recovery of a variety of metal ions, including but not limited to aluminum, arsenic, antimony, bismuth, cadmium, chromium, copper, cobalt, gallium, gold, haffnium, indium, iridium, iron, lead, manganese, mercury, molybdenum, neodymium, nickel niobium, osmium, palladium, platinum, rhenium, rhodium, ruthenium, selenium, silver, tantalum, tellurium, thallium, thorium, tin, tungsten, uranium, vanadium, zinc or zirconium. One of ordinary skill in the art can determine which metals can be successfully removed by use of the present invention. Of course, the applicability of the method of the present invention to any particular metal depends upon the stability of the metal complex formed with ammonia or other weak base or salt thereof as well as the stability of the complex formed between the metal and the extractant.

The supported liquid membrane used in the present invention employs a porous support material which separates the metal-containing feed solution from the stripping solution. The support material may be comprised of a variety of materials, including but not limited to polyethylene, polypropylene, mixed cellulose, polytetrafluoroethylene, polyphenylene oxide, polybutylene, polystyrene, polyvinylchloride, acrylonitrile, butadienestyrene terpolymer, styrene-acrylonitrile copolymer, styrenebutadiene copolymer, polysulfone, poly(4-methyl-pentene-1), polyvinylidene chloride, polybenzimidazole and chlorinated polyethylene. The porosity of such materials ranges from about 20 to 80%.

The SLM process of the present invention may employ a variety of organic extractants within the porous support material to assist in removal of the metal ions from the feed solution. Such extractants include but are not limited to β-diketones, hydroxyoximes or other oil soluble extractants, as well as macrocyclic polyethers such as crown ethers, different LIX's available from Henkel Corporation, hydrophobic amines, alkylated cupferrones, etc. The above listing is not all-inclusive and other extractants may be used with success in the present invention, the selection of which is within the skill of the routineer in the art. See, for example, the discussion of extractants in U.S. Pat. No. 5,114,579, herein incorporated by reference.

Although a number of extractant agents may exist as liquids, and thus may not require a liquid solvent to permeate the porous polymeric support, it may be preferable to dissolve the complexing agent in an organic liquid solvent that is chemically compatible with and functions as a solvent for the complexing agent. Such liquid solvents also serve to enhance the rate of diffusion of the extracted metal ions through the supported liquid membrane. A wide variety of aliphatic and aromatic hydrocarbons can be employed as the liquid solvent, including but not limited to xylene, benzene, decanol, toluene, kerosene, dodecane, decane, 2-nitrophenyloctyl ether, mineral spirits, and mixtures thereof, etc.

When a liquid solvent is employed, the complexing agent is dissolved in the solvent liquid to the desired concentration, i.e., a concentration within the range of from about 2 to about 70 percent by weight, preferably from about 10 to about 25 percent by weight of the complexing agent based on the combined weight of the solvent and the complexing agent. The resulting mixture is then used to impregnate a porous polymeric support such as a film or hollow fiber.

The SLM process of the present invention may employ a variety of acidic stripping solutions/agents to remove the metal ions from the membrane. Such stripping agents include but are not limited to sulfuric acid, hydrochloric acid, nitric acid, etc. This listing is not all-inclusive and one of ordinary skill in the art can readily identify a suitable stripping agent for use in the present invention. A concentration of at approximately 2M has been found to be an acceptable concentration for the stripping agent.

The present invention is described by the following examples which are intended to be merely illustrative of the invention and not limiting thereof.

EXAMPLES 1–9

Figure 3:
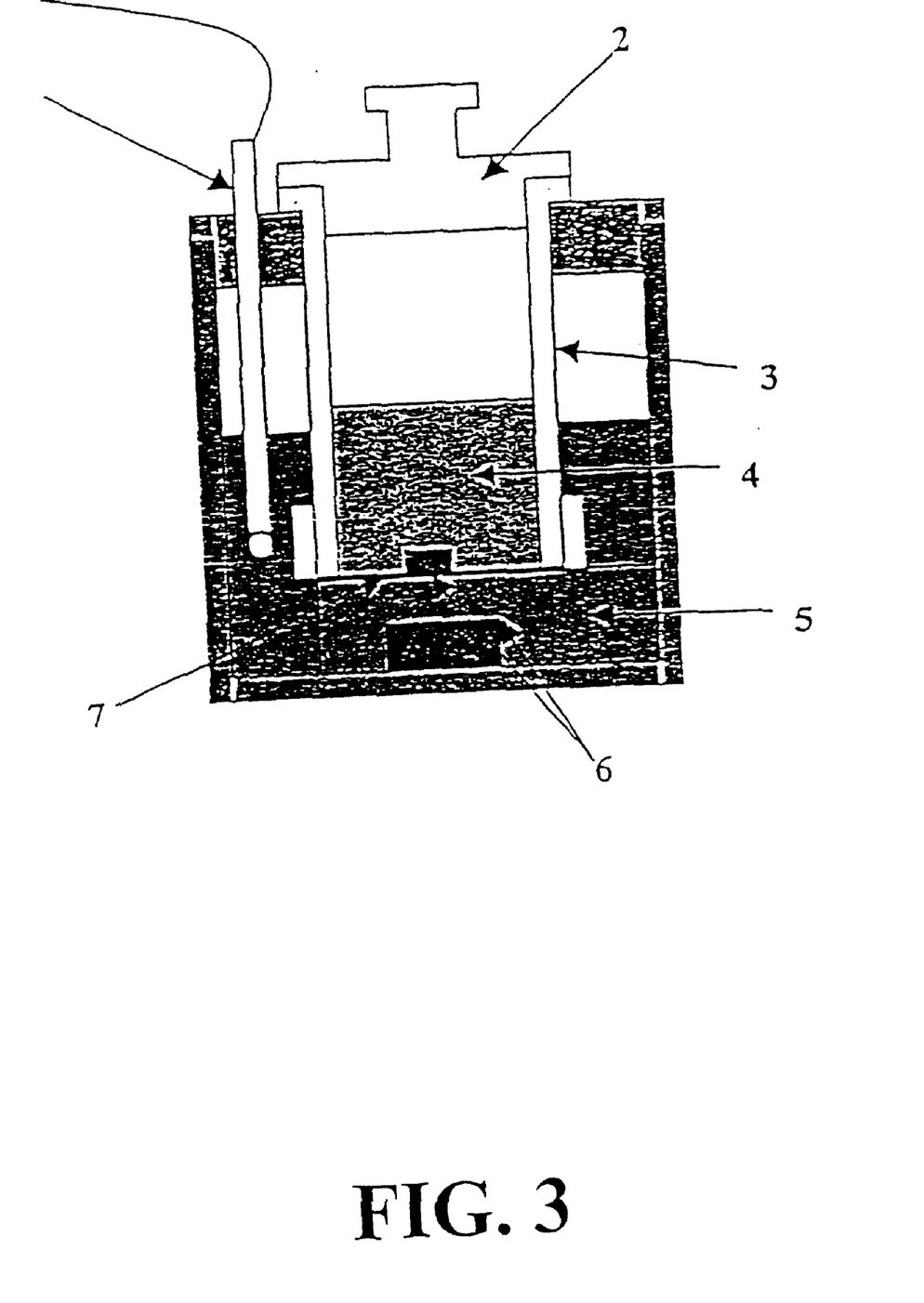
FIG. 3 depicts a module containing a flat horizontal supported liquid membrane which may be used in the present invention.

A module having a flat horizontal membrane as depicted in FIG. 3 was used to demonstrate the advantages of the present invention. The module employed a 10 cm$^2$ flat membrane, and the volume of the feed solution was 100 cm$^3$ and the volume of the stripping solution was 20 cm$^3$. As depicted in the Figure, the module included a pH electrode 1, a TEFLON cap 2, a TEFLON cylinder 3, stripping solution 4, feed solution 5 (copper-containing wastewater), magnetic bars 6 and supported liquid membrane 7.

In the Examples, NaOH and an aqueous solution of $NH_3$ were added to the aqueous feed solution in order to adjust the pH to between 6–7 and the $NH_3$ concentration to between 0.5–8M as summarized in Table 1 below. A stripping solution was prepared by diluting concentrated sulfuric acid in deionized water to yield 2M sulfuric acid as the stripping solution. Both solutions were mechanically stirred with magnetic stirrers at 250 rpm.

A 33% v/v solution of LIX 54 (a mixture of phenylalkyl-β-diketones with 1-phenyldecanone-1,3-diones as the major component) or LIX 84 (2-hydroxy-5-nonylacetophenone oxime as an active substance) in kerosene solvent was used as the extractant solution for membrane impregnation. The extractant solutions were prepared by diluting 8.3 ml of commercial extractant (a kerosene solution of LIX is available from Henkel corporation) in kerosene (Aldrich) to 25 ml. Other water immiscible solvents including KERMAC 500-T (Triangle Refineries), SHELLSOL T, SHELLSOL AB (Shell), ISOPAR M (Exxon Chemical Co), dodecane, decane, 2-nitrophenylocytyl ether or their mixtures can be used with the liquid membrane. Porous TEFLON film (Millipore filter type FG, nominal pore size 0.2 μm, typical porosity –0.70 and the thickness –50 μm) was impregnated with a kerosene solution of LIX. Other hydrophobic porous materials, such as polypropylene, polyethylene, mixed cellulose, etc. can be used as a porous support. An excess of impregnating liquid on a Millipore filter was removed by use of tissue paper and an impregnated TEFLON filter was placed into the module as a flat horizontal membrane to separate aqueous feed and stripping solutions.

Figure 1:
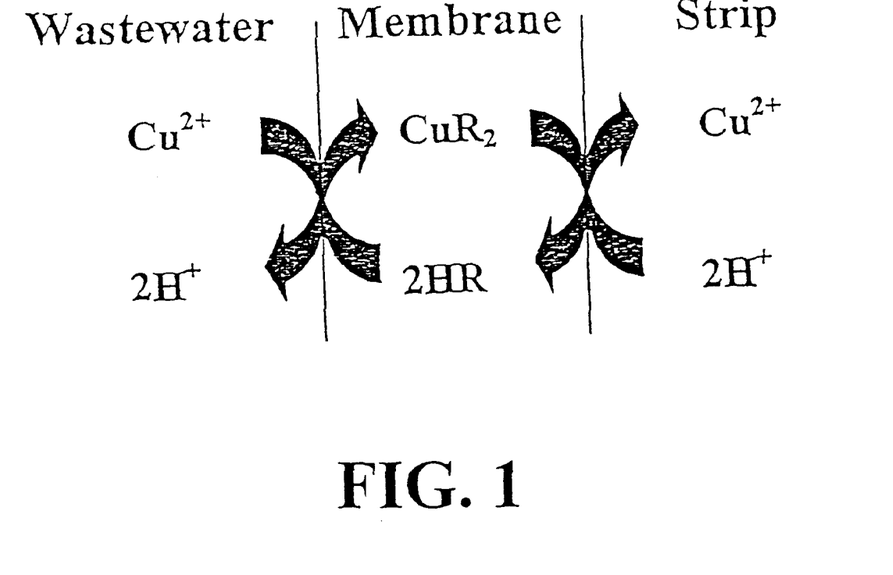
FIG. 1 depicts the mechanism of $Cu^{2+}/2H^+$ exchange through a supported liquid membrane by use of an ammonia-free feed solution.

The concentration of copper ion in the feed and stripping solutions was measured periodically by use of a UV-VIS-NIR spectrophotometer or atomic absorption spectrophotometer. pH values were monitored using a pH meter with a glass electrode. Table 1 below demonstrates the effect of pH and ammonia concentration in the feed solution and copper concentration in the stripping solution on copper removal from the feed solution after 8 hrs of the SLM extraction process. The copper concentration in each of the feed solutions is $2.1 \times 10^{-2}$M. Initially the stripping solution is 2M sulfuric acid. The membrane impregnating solution comprises 33% v/v LIX in kerosene.

in FIG. 1 which results in an increasing hydrogen ion concentration in the feed solution during the SLM process. Lower concentrations of $NH_3$ do not permit effective removal of copper (see Examples 5 and 6 above).

At high pH's (e.g., 10.3 as exemplified in Example 9) the feed solution became nontransparent and yellowish, probably due to the washing out of the extractant from the membrane. Some copper-containing waste solutions initially have large amounts of ammonia and a high pH (i.e., strong ammoniacal solutions). These solutions may be mixed with acidic solutions before treatment and metal removal undertaken with supported liquid membranes consistent with the present invention.

TABLE 1

| Examples # | Initial Composition of Feed solution | Carrier | Final Concentration of Cu and pH in the Feed Solution | Final Concentration of Cu in the Stripping Solution |
|---|---|---|---|---|
| 1 | $C_{Cu} = 2.05 \times 10^{-2}$M<br>pH = 3.45<br>$NH_3$ = 0M | LIX 84 | $C_{Cu} = 0.93 \times 10^{-2}$M<br>pH = 2.0 (blue solution) | $C_{Cu} = 5.65 \times 10^{-2}$M |
| 2 | $C_{Cu} = 2.05 \times 10^{-2}$M<br>pH = 3.45<br>$NH_3$ = 0M | LIX 54 | $C_{Cu} = 1.72 \times 10^{-2}$M<br>pH = 2.42 (blue solution) | $C_{Cu} = 1.69 \times 10^{-2}$M |
| 3 | $C_{Cu} = 2.11 \times 10^{-2}$M<br>pH = 4.7<br>$NH_3$ = 0.1M | LIX 84 | $C_{Cu} = 0.73 \times 10^{-2}$M<br>pH = 2.46 (blue solution) | $C_{Cu} = 6.74 \times 10^{-2}$ M |
| 4 | $C_{Cu} = 2.11 \times 10^{-2}$M<br>pH = 4.7<br>$NH_3$ = 0.1M | LIX 54 | $C_{Cu} = 1.05 \times 10^{-2}$M<br>pH = 2.83 (blue solution) | $C_{Cu} = 2.21 \times 10^{-2}$M |
| 5 | $C_{Cu} = 2.11 \times 10^{-2}$M<br>pH = 6 $NH_3$ = 0.1M | LIX 84 | $C_{Cu} = .041 \times 10^{-2}$M<br>pH = 3.27 (blue solution) | $C_{Cu} = 8.33 \times 10^{-2}$M |
| 6 | $C_{Cu} = 2.11 \times 10^{-2}$M<br>pH = 6 $NH_3$= 0.1M | LIX 54 | $C_{Cu} = 1.05 \times 10^{-2}$M<br>pH = 5.01 (blue solution) | $C_{Cu} = 5.50 \times 10^{-2}$M |
| 7 | $C_{Cu} = 2.13 \times 10^{-2}$M<br>pH = 7 $NH_3$ = 1M | LIX 84 | $C_{Cu} = 1.3 \times 10^{-2}$M<br>(0.8 ppm)<br>pH = 7.63<br>(colorless and transparent solution) | $C_{Cu} = 1.03 \times 10^{-1}$M |
| 8 | $C_{Cu} = 2.13 \times 10^{-2}$M<br>pH = 7 $NH_3$ = 1M | LIX 54 | $C_{Cu} = 0.8 \times 10^{-5}$M<br>(0.5 ppm)<br>pH = 7.84<br>(colorless and transparent solution) | $C_{Cu} = 1.06 \times 10^{-1}$M |
| 9 | $C_{Cu} = 2.16 \times 10^{-2}$M<br>pH = 10.3<br>$NH_3$ = 1M | LIX 84 | $C_{Cu} < 10^{-4}$M<br>pH = 10.06<br>(yellowish and non transparent solution) | $C_{Cu} = 1.02 \times 10^{-1}$M |

Figure 2:
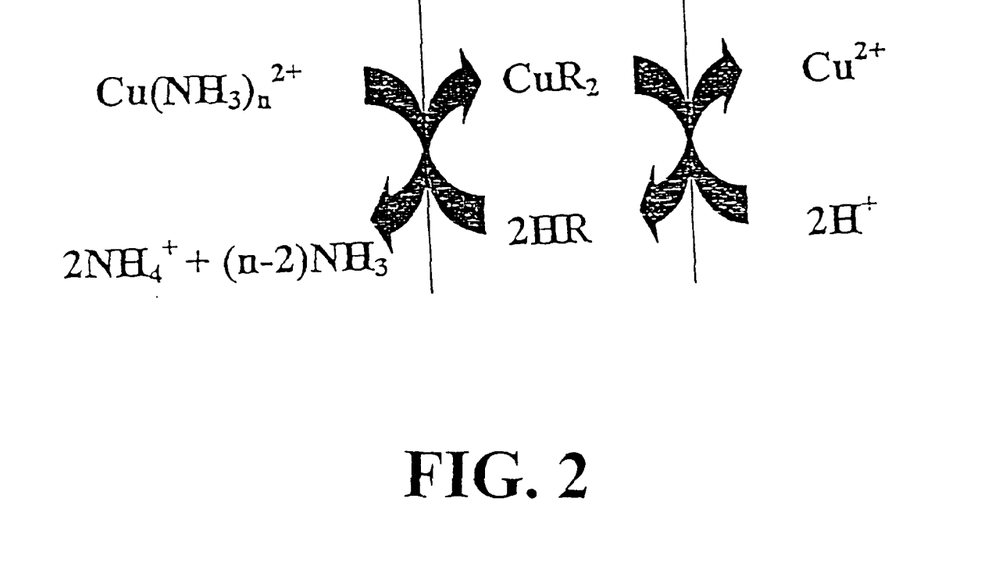
FIG. 2 depicts the mechanism of $Cu^{2+}/2H^+$ exchange through a supported liquid membrane by use of an ammonia-containing feed solution.

Examples 1–4 in Table 1 above demonstrate that the removal of copper was low and ineffective at a low pH (e.g., 3.45 and 4.7) and $NH_3$ content (0.1 M or less). The addition of an aqueous solution of ammonia to increase the ammonia concentration to 1M at a pH of 7 provides highly effective removal of copper ions from water (see Examples 7 and 8), with the feed solution becoming colorless and the pH increasing slightly. Chemical analysis demonstrates that the addition of ammonia and the adjustment of the pH converted $Cu^{2+}$ ions in the feed solution into the complex form $[Cu(NH_3)_2]^{2+}$. Extraction of copper from this complex ion into the membrane is accompanied by release of two $NH_3$ molecules, which then bind two $H^+$ ions in the feed solution. This explains the fact that pH of the feed solution does not decrease as the result of transmembrane transport as illustrated in the FIG. 2, in contrast to the mechanism depicted

EXAMPLE 10

A model aqueous metal-containing feed solution, similar to industrial solutions resulting from sedimentation of complex copper salts is prepared and described in Table 2 below:

TABLE 2

| Item | Results |
|---|---|
| Color | Greenish to Blue |
| pH | 3–5 |
| $Cl^-$ | 0.5M |
| $Na^+$ | $3 \times 10^{-2}$M |
| $NH_4^+ + NH_3$ | 4M |
| Cu | $2 \times 10^{-2}$M |

TABLE 2-continued

| Item | Results |
|---|---|
| Zn | $2 \times 10^{-3}$ M |
| Hg | $5 \times 10^{-4}$ M |
| Ni | $4 \times 10^{-5}$ M |
| Cd | $2 \times 10^{-6}$ M |
| Ca | $1 \times 10^{-4}$ M |
| Fe total | $5 \times 10^{-5}$ M |

Figure 4:
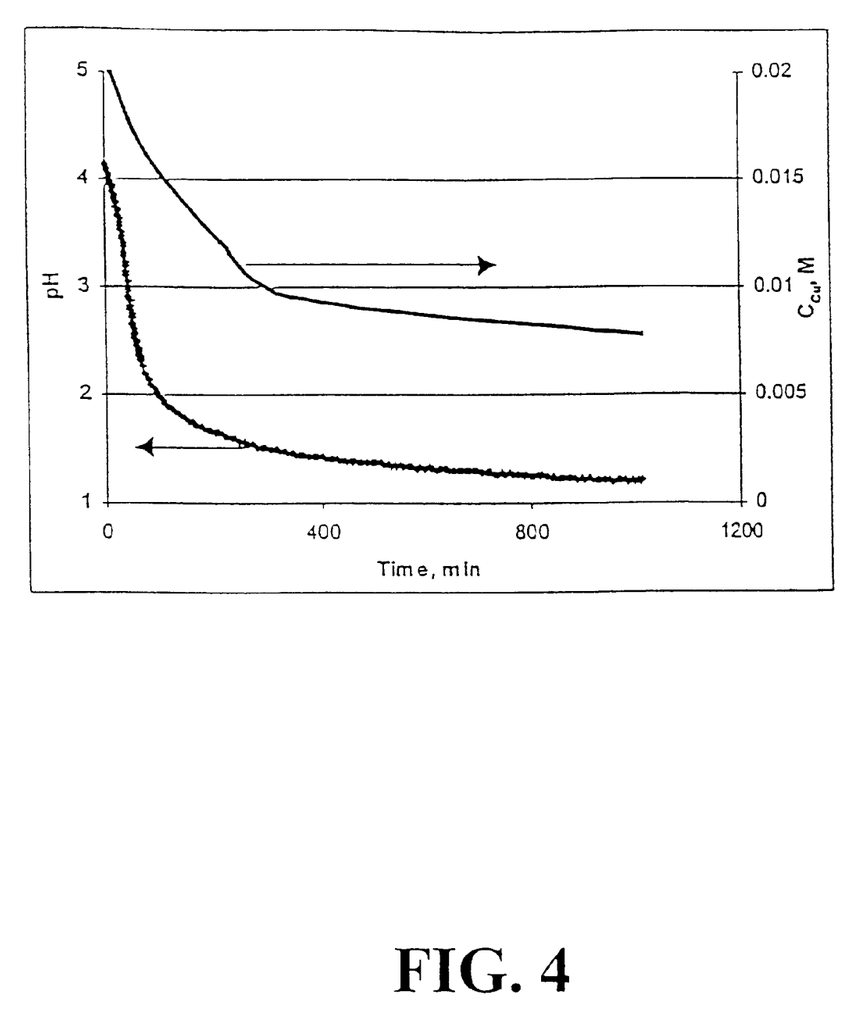
FIG. 4 is a graphical depiction of the kinetics of pH change and copper (II) concentration in the feed solution at an initial pH of 4.0 for the feed solution.
Figure 5:
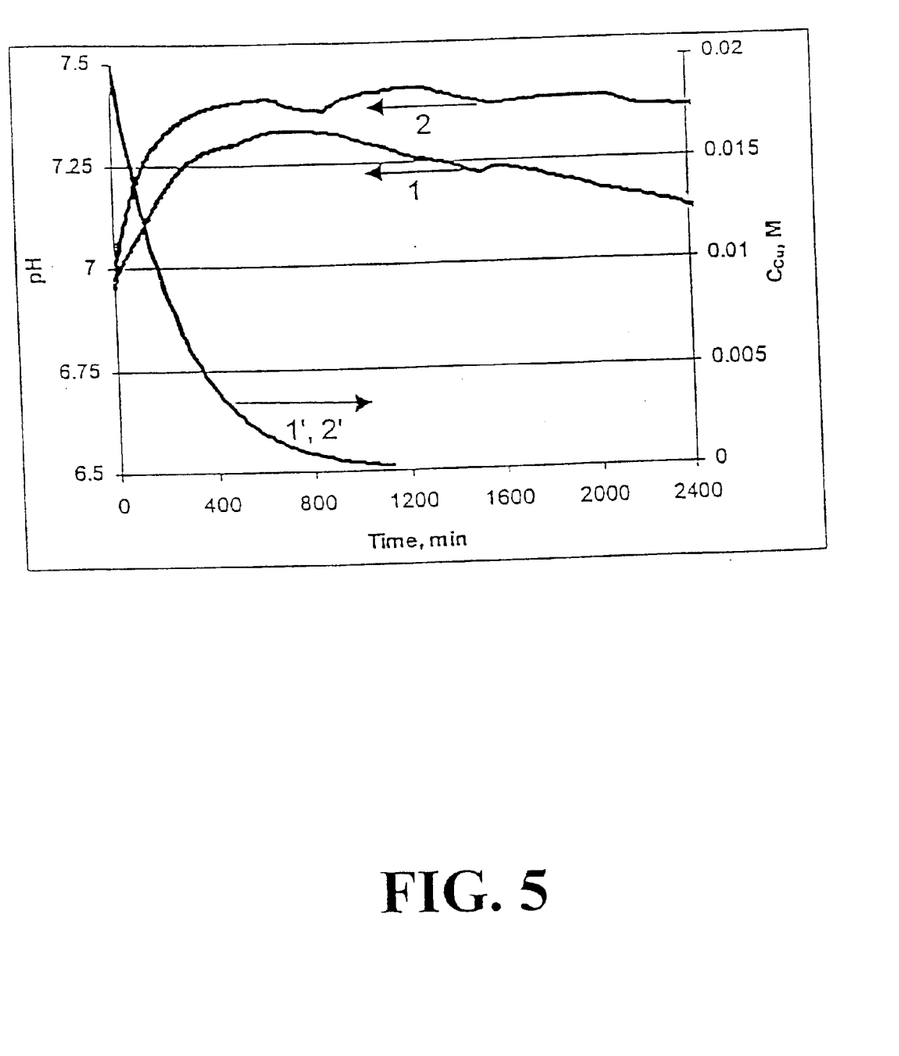
FIG. 5 is a graphical depiction of the kinetics of pH change and copper (II) concentration in the feed solution at an initial pH of 7.0 for the feed solution.

Experiments with this model solution were conducted in the flat horizontal membrane depicted in FIG. 3. The change in copper concentration and pH of the solution during metal removal is depicted in FIGS. 4 and 5. If the initial pH of the feed solution is 4 as shown in FIG. 4, the rate of Cu(II) transport decreases with time and levels off without reaching completion and the process practically ceases due to the simultaneous decrease of the pH in the donor solution. As a result, it is extremely difficult to achieve complete removal of copper without adjusting the pH of the feed solution during the SLM process.

If the initial pH of the feed solution is approximately 7 with the additional presence of ammonia, the rate of pH change is drastically altered as shown in FIG. 5. In FIG. 5, practically all copper was removed from the feed solution at the moment when the pH reaches a maximum value, after which it slowly decreases.

The initial tendency of the pH to increase results from the presence of high ammonium concentration. At an alkaline pH and high ammonia concentration, copper in the donor solution exists mainly as a complex with four ammonia molecules. When copper is extracted into the organic phase the release of ammonia results in a more alkaline pH. The process of copper transport can be described by the equation:

$$[Cu(NH_3)_4]^{2+}{}_{Feed}+2H^+{}_{Strip}=2NH_4^+{}_{Feed}+2NH_{3Feed}+Cu^{2+}{}_{Strip}$$

Initial rates of copper removal are approximately similar in all three cases presented in FIGS. 4 and 5, but if the initial pH of the feed solution is approximately 7, copper can be removed almost completely and continual pH adjustment is unnecessary. However, at a pH near 4, the ammonium ion is not bound to the copper and the existence of ammonia in the feed solution does not significantly influence the SLM process.

EXAMPLE 11

Figure 6:
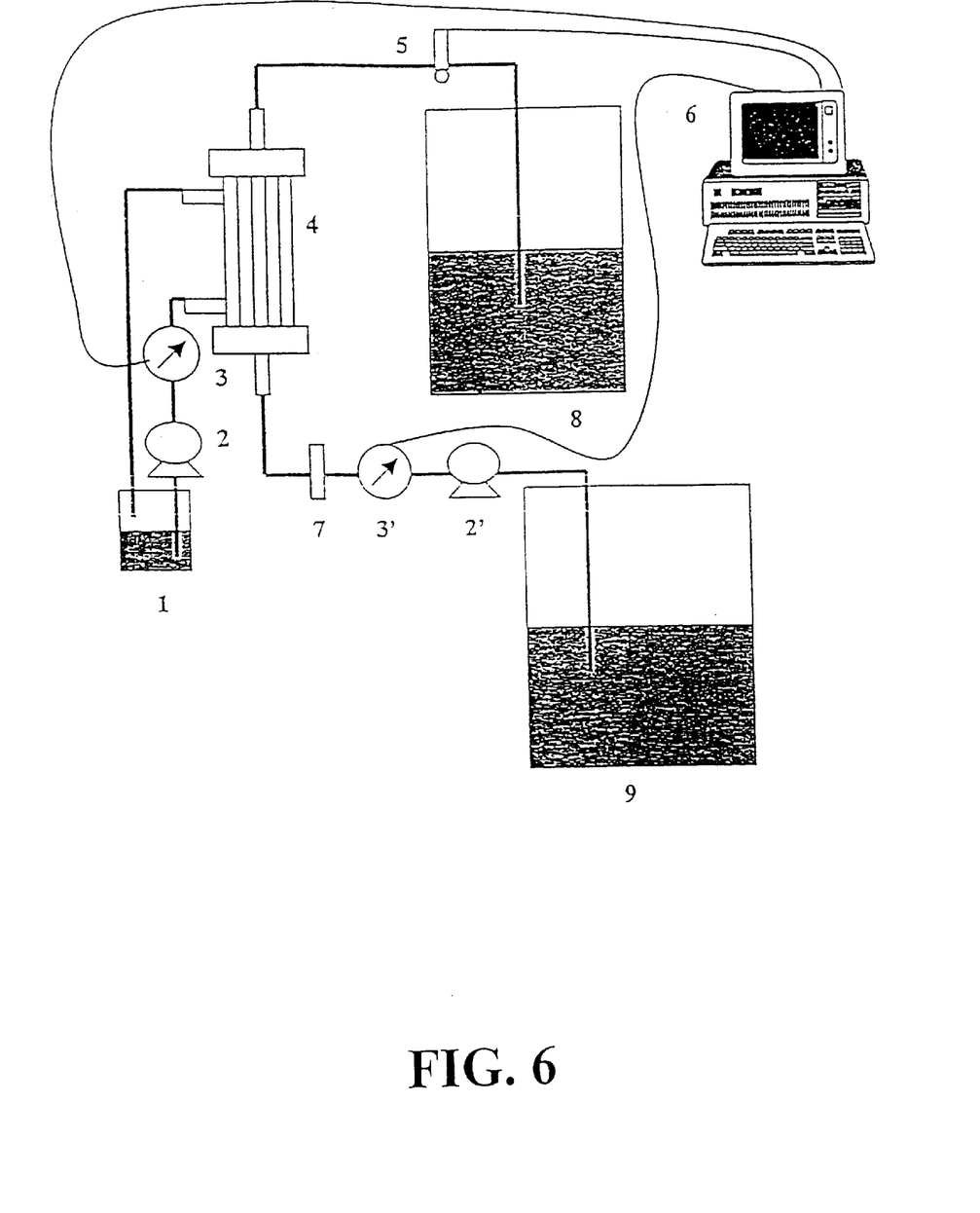
FIG. 6 is a schematic diagram of supported liquid membrane system using a hollow fiber module which may be employed in the present invention.

The polypropylene hollow fiber module 5PCM-102 (Hoechst Celanese Corporation) depicted in FIG. 6 was used in this pilot scale example. The supported membrane system used in Example 11 and depicted in FIG. 6 comprises bottle 1 with stripping solution, peristaltic pumps 2,2', pressure transducers 3,3', hollow fiber module 4, pH electrode 5, data acquisition system 6, filter 7, purified water tank 8, and feed solution tank 9.

The characteristics of the hollow fiber module employed in Example 11 are shown in Table 3 below:

TABLE 3

| | |
|---|---|
| Effective surface area of fibers | 1 m² |
| Fiber wall thickness | 30 μm |
| Effective pore size | 0.05 μm |
| Porosity | 30% |

TABLE 3-continued

| | |
|---|---|
| Effective internal diameter | 240 μm |
| Effective fiber length | 18.4 cm |
| Number of fibers | 7500 |

The hollow fibers were impregnated with 33% v/v solution of LIX 54 in kerosene. Excess impregnated liquid was removed by pumping water inside the fibers. The model feed solution of Example 10 was pumped into the hollow tubes of the module and separation of the copper ions undertaken. The results of the example are summarized in Table 4 below:

TABLE 4

| | |
|---|---|
| Composition of stripping solution | $H_2SO_4$ = 1–2M, Cu(II) = 0–1M |
| Flow rate of stripping solution | 150 cm³/min |
| Cu, concentration of $NH_3$ and pH at the inlet of the module | Cu(II) = 2.0 × 10⁻²M NH₃ = 4M pH = 7.0 |
| Flow rate of feed stream | 65 cm³/min |
| Cu, concentration of $NH_3$ and pH at the outlet of the module | Cu(II) = 3.8 × 10⁻⁴M NH₃ = 4M pH = 8.1 |

As demonstrated in Example 11, the present invention permits purification of metal (e.g. copper) containing feedstream in one pass through the hollow fiber module while still yielding a colorless solution. The final copper concentration after the treatment decreased approximately 50 times and can be decreased further with serial connection of modules. It has been determined that a module with a hollow fiber surface area of 1 m² can purify approximately 4 liters of wastewater per hour. Copper sulphate pentahydrate, which can be crystallized from the stripping solution upon recovery of copper from the membrane in a conventional manner, has a purity comparable with reagent grade product.

What is claimed is:

1. A process for the removal/recovery of metal ions from aqueous metal ion-containing solutions by use of a supported liquid membrane, said process comprising contacting a metal ion-containing aqueous solution with a first side of said supported liquid membrane, said membrane containing an extractant for said metal ions whereby said metal ions are extracted from said aqueous solution by said extractant, contacting a stripping solution with a second side of said supported liquid membrane to strip said metal ions from said extractant into said stripping solution, and wherein said metal ion-containing aqueous solution has a pH within the range of from about 5.5 to about 8 and a concentration of a weak base in stoichiometric excess to that of said metal ions in said aqueous solution, thereby forming a complex between said weak base and said metal ion.

2. A process as defined in claim 1 wherein the weak base is selected from the group consisting of ammonia, hydrophilic organic amines and salts thereof.

3. A process as defined in claim 1, wherein said extractant is selected from the group consisting of β-diketones, hydroxyoximes, macrocyclic polyethers, hydrophobic amines, and alkylated cupferrones.

4. A process as defined in claim 1 wherein the extractant is diluted with a liquid solvent.

5. A process as defined in claim 1 wherein the pH of the aqueous solution ranges from about 6 to about 7.

6. A process as defined in claim 1 wherein the concentration of said weak base in said aqueous solution ranges from about 0.5 to about 8M.

7. A process as defined in claim 1, wherein said metal ions are selected from the group consisting of aluminum, arsenic, antimony, bismuth, cadmium, chromium, copper, cobalt, gallium, gold, haffnium, indium, iridium, iron, lead, manganese, mercury, molybdenum, neodymium, nickel niobium, osmium, palladium, platinum, rhenium, rhodium, ruthenium, selenium, silver, tantalum, tellurium, thallium, thorium, tin, tungsten, uranium, vanadium, zinc and zirconium.

8. A process as defined in claim 1, wherein said membrane is comprised of a material selected from the group consisting of polyethylene, polypropylene, mixed cellulose, polytetrafluoroethylene, polyphenylene oxide, polybutylene, polystyrene, polyvinylchloride, acrylonitrile, butadienestyrene terpolymer, styrene-acrylonitrile copolymer, styrenebutadiene copolymer, polysulfone, poly(4-methyl-pentene-1), polyvinylidene chloride, polybenzimidazole and chlorinated polyethylene.

9. A process as defined in claim 1, wherein said metal ion is a copper ion.

10. A process as defined in claim 1, wherein said stripping solution is selected from the group consisting of sulfuric acid, hydrochloric acid, and nitric acid.

11. A process as defined in claim 10, wherein said stripping solution comprises sulfuric acid.

12. A process as defined in claim 1, further comprising recovering said metal ions from said stripping solution.

13. A process as defined in claim 12, wherein said metal ions are recovered by crystallization of metal salts in said stripping solution.

14. A process as defined in claim 12, wherein said metal ions are copper ions and said copper ions are removed by electrowinning of copper ions from said stripping solution.

15. A process as defined in claim 1, wherein said weak base is present in said aqueous solution in a molar concentration of at least 2–4 times greater than the molar concentration of the metal ions in said aqueous solution.

16. A process for the removal/recovery of metal ions from aqueous metal ion-containing solutions by use of a supported liquid membrane, said process comprising contacting a metal ion-containing aqueous solution with a first side of said supported liquid membrane, said membrane containing an extractant for said metal ions whereby said metal ions are extracted from said aqueous solution by said extractant, contacting a stripping solution with a second side of said supported liquid membrane to strip said metal ions from said extractant into said stripping solution, and wherein said metal ion-containing aqueous solution has a concentration of a weak base in stoichiometric excess to that of said metal ions in said aqueous solution and the pH of said aqueous solution is such that a complex is formed between said weak base and said metal ions.

17. A process as defined in claim 16 wherein the weak base is selected from the group consisting of ammonia, hydrophilic organic amines and salts thereof.

18. A process as defined in claim 16, wherein said extractant is selected from the group consisting of β-diketones, hydroxyoximes, macrocyclic polyethers, hydrophobic amines, and alkylated cupferrones.

19. A process as defined in claim 16 wherein the extractant is diluted with a liquid solvent.

20. A process as defined in claim 16 wherein the concentration of said weak base in said aqueous solution ranges ranges from about 0.5 to about 8M.

21. A process as defined in claim 16, wherein said metal ions are selected from the group consisting of aluminum, arsenic, antimony, bismuth, cadmium, chromium, copper, cobalt, gallium, gold, hafnium, indium, iridium, iron, lead, manganese, mercury, molybdenum, neodymium, nickel niobium, osmium, palladium, platinum, rhenium, rhodium, ruthenium, selenium, silver, tantalum, tellurium, thallium, thorium, tin, tungsten, uranium, vanadium, zinc and zirconium.

22. A process as defined in claim 16, wherein said membrane is comprised of a material selected from the group consisting of polyethylene, polypropylene, mixed cellulose, polytetrafluoroethylene, polyphenylene oxide, polybutylene, polystyrene, polyvinylchloride, acrylonitrile, butadienestyrene terpolymer, styrene-acrylonitrile copolymer, styrenebutadiene copolymer, polysulfone, poly(4-methyl-pentene-1), polyvinylidene chloride, polybenzimidazole and chlorinated polyethylene.

23. A process as defined in claim 16, wherein said metal ion is a copper ion.

24. A process as defined in claim 16, wherein said stripping solution is selected from the group consisting of sulfuric acid, hydrochloric acid, and nitric acid.

25. A process as defined in claim 24, wherein said stripping solution comprises sulfuric acid.

26. A process as defined in claim 16, further comprising recovering said metal ions from said stripping solution.

27. A process as defined in claim 26, wherein said metal ions are recovered by crystallization of metal salts in said stripping solution.

28. A process as defined in claim 26, wherein said metal ions are copper ions and said copper ions are removed by electrowinning of copper ions from said stripping solution.

29. A process as defined in claim 16, wherein said weak base is present in said aqueous solution in a molar concentration of at least 2–4 times greater than the molar concentration of the metal ions in said aqueous solution.

* * * * *